(12) United States Patent
Hochi

(10) Patent No.: US 7,741,382 B2
(45) Date of Patent: Jun. 22, 2010

(54) RUBBER COMPOSITION FOR TREAD AND TIRE HAVING TREAD USING SAME

(75) Inventor: Kazuo Hochi, Kobe (JP)

(73) Assignee: Sumitomo Rubber Industries, Ltd., Kobe-Shi, Hyogo (JP)

( * ) Notice: Subject to any disclaimer, the term of this patent is extended or adjusted under 35 U.S.C. 154(b) by 0 days.

(21) Appl. No.: 12/224,332

(22) PCT Filed: May 14, 2007

(86) PCT No.: PCT/JP2007/059862

§ 371 (c)(1),
(2), (4) Date: Aug. 25, 2008

(87) PCT Pub. No.: WO2007/132811

PCT Pub. Date: Nov. 22, 2007

(65) Prior Publication Data

US 2009/0054550 A1   Feb. 26, 2009

(30) Foreign Application Priority Data

May 17, 2006  (JP) .............................. 2006-137862
Nov. 30, 2006  (JP) .............................. 2006-324195

(51) Int. Cl.
*C08J 5/14*   (2006.01)
*B60C 1/00*   (2006.01)

(52) U.S. Cl. ........................ 523/155; 524/496

(58) Field of Classification Search ................... 523/155
See application file for complete search history.

(56) References Cited

U.S. PATENT DOCUMENTS

| | | | | |
|---|---|---|---|---|
| 5,470,905 A | * | 11/1995 | Meier et al. | 524/493 |
| 2002/0042479 A1 | | 4/2002 | Nanni et al. | |
| 2006/0183840 A1 | * | 8/2006 | Hirayama et al. | 524/493 |

FOREIGN PATENT DOCUMENTS

| EP | 0 680 998 A1 | 11/1995 |
|---|---|---|
| JP | 7-149955 A | 6/1995 |
| JP | 2000-344954 A | 12/2000 |
| JP | 2002-533234 A | 10/2002 |
| JP | 2005-232295 A | 9/2005 |
| JP | 2006-36965 A | 2/2006 |
| JP | 2006-199858 A | 8/2006 |
| JP | 2006-219631 A | 8/2006 |

* cited by examiner

*Primary Examiner*—Ling-Siu Choi
*Assistant Examiner*—Hui Chin
(74) *Attorney, Agent, or Firm*—Birch, Stewart, Kolasch & Birch, LLP

(57) ABSTRACT

The present invention provides a rubber composition for a tread which can improve both of grip performance and rolling resistance in good balance and a tire having a tread prepared by using it. The rubber composition for a tread of the present invention contains 30 to 80 parts by weight of a silica having a pH of 7.1 to 12.0 when dispersed in water to prepare a 5% aqueous dispersion; and not more than 10 parts by weight of a carbon black on the basis of 100 parts by weight of a rubber component comprising an epoxidized natural rubber and the tire of the present invention has a tread prepared by using the rubber composition.

5 Claims, No Drawings

RUBBER COMPOSITION FOR TREAD AND TIRE HAVING TREAD USING SAME

TECHNICAL FIELD

The present invention relates to a rubber composition for a tread and a tire having a tread prepared by using the composition.

BACKGROUND ART

A rubber composition prepared by using a rubber component containing only a natural rubber has been used as a rubber composition for a tread. However, in that case, since grip force of obtained tires is low, grip performance has been improved by using a synthetic rubber such as a styrene-butadiene rubber derived from petroleum resources as a rubber component in addition to the natural rubber.

However, in recent years, environmental problems have been emphasized and regulations on $CO_2$ emission have been made rigorous. Further, since petroleum resources are finite and its supply quantity has been reduced year by year, petroleum price is predicted to surge in future and there is a limit in using raw materials derived from petroleum resources such as a styrene-butadiene rubber. Consequently, considering petroleum depletion in future, it is necessary to use resources other than petroleum such as a natural rubber and white fillers such as silica and calcium carbonate.

However, even if non-petroleum resources are used, equal or better tread performances (for example, grip performance of a tire) are required compared with performances of conventional treads obtained by use of petroleum resources.

In order to improve performance of a tread portion of a tire by using non-petroleum resources, JP2002-533234A discloses a process for preparing a rubber composition for a tire containing, as a rubber component, an epoxidized natural rubber, which is a non-petroleum resource. However, although grip performance is not inferior as compared with a tire using petroleum resources, rolling resistance cannot be adequately reduced. Thus, reduction of rolling resistance is further required, considering influence on environment.

DISCLOSURE OF INVENTION

It is an object of the present invention to provide a rubber composition for a tread that can make it possible to consider environment, can prepare for decrease in petroleum supply in future, can reduce rolling resistance and can improve grip performance, and a tire having a tread prepared by using it.

The present invention relates to a rubber composition for a tread comprising 30 to 80 parts by weight of a silica having a pH value of 7.1 to 12.0 when dispersed in water to prepare a 5% aqueous dispersion and not more than 10 parts by weight of a carbon black based on 100 parts by weight of a rubber component comprising an epoxidized natural rubber.

In the aforementioned rubber component, a content of the epoxidized natural rubber is preferably not less than 50% by weight.

Further, the present invention relates to a tire having a tread prepared by using the aforementioned rubber composition for a tread.

BEST MODE FOR CARRYING OUT THE INVENTION

The rubber composition for a tread of the present invention comprises a rubber component, silica and carbon black.

The rubber component comprises an epoxidized natural rubber (ENR).

ENR is not particularly limited and ENR prepared by adding an epoxidizing agent such as peracetic acid to an emulsion of a natural rubber (NR) can be used.

An epoxidization ratio of ENR is preferably not less than 15% by mole, more preferably not less than 20% by mole. When the epoxidization ratio of ENR is less than 15% by mole, grip performance tends to be inadequate. Further, the epoxidization ratio of ENR is preferably not more than 85% by mole, more preferably not more than 50% by mole. When the epoxidization ratio of ENR exceeds 85% by mole, the rolling resistance tends to be increased.

A content of ENR in the rubber component is preferably not less than 50% by weight, more preferably not less than 70% by weight, further preferably not less than 80% by weight. When the content of ENR is less than 50% by weight, grip performance tends to be lowered. Further, the content of ENR is most preferably 100% by weight.

As the rubber component, in addition to ENR, there can be used rubber components that are generally used in the tire industry, for example, NR, an isoprene rubber (IR), a butadiene rubber (BR), a styrene-butadiene rubber (SBR), a butyl rubber (IIR), a halogenated butyl rubber (X-IIR), an acrylonitrile-butadiene rubber (NBR), a chloroprene rubber (CR), an ethylene-propylene-diene rubber (EPDM), a halogenated product of a copolymer of isomonoolefin and p-alkylstyrene. These rubber components other than ENR may be used alone and at least 2 of these may be used in combination. Among these, NR is preferable because it is derived from non-petroleum resources, and thus, makes it possible to consider environment, prepare for decrease in petroleum supply in future, reduce rolling resistance and improve grip performance.

When NR is contained, a content of NR in the rubber component is preferably not more than 50% by weight, more preferably not more than 30% by weight, further preferably not more than 20% by weight. When the content of NR exceeds 50% by weight, grip performance tends to be lowered.

A silica is not particularly limited, and those prepared by a dry process or a wet process are exemplified.

BET specific surface area (BET) of silica is preferably not less than 30 $m^2/g$, more preferably not less than 45 $m^2/g$. When the BET of silica is less than 30 $m^2/g$, abrasion resistance tends to be deteriorated. Further, the BET of silica is preferably not more than 250 $m^2/g$, more preferably not more than 200 $m^2/g$. When the BET of silica exceeds 250 $m^2/g$, processability at kneading is lowered and it tends to be difficult to disperse the silica.

A pH (5% pH) at which the silica is dispersed in water to prepare a 5% aqueous dispersion is not less than 7.1, preferably not less than 7.4. When the 5% pH is less than 7.1, the rolling resistance is increased. Further, the 5% pH is not more than 12.0, preferably not more than 11.0. It is difficult to produce a silica having a 5% pH exceeding 12.0 and cost increases.

As for the silica, silica conventionally used in the rubber industry can be used. Examples of the silica having a 5% pH satisfying the requirement of the present invention are Carplex#1120 (5% pH: 10.6) available from Degussa GmbH, Carplex#67 (5% pH: 7.9) available from Degussa GmbH, Ultrasil 360 (5% pH: 9.0) available from Degussa GmbH, and ZEOSIL 40 (5% pH: 8.1) available from Rhodia.

Examples of a silica having a 5% pH not satisfying the requirement of the present invention are Ultrasil VN3 (5% pH: 6.2) available from Degussa GmbH, Nippseal VN3 AQ (5% pH: 6.0) available from TOSOH SILICA CORPORA- TION, Zeosil 1165MP (5% pH: 6.2) available from Rhone-Poulenc Industries SA, Carplex CS-7 (5% pH: 6.1) available from Degussa GmbH.

A content of the silica is not less than 30 parts by weight, preferably not less than 50 parts by weight based on 100 parts by weight of the rubber component. When the content of the silica is less than 30 parts by weight, environment cannot be considered, decrease in petroleum supply in future cannot be prepared for and further, adequate grip performance cannot be obtained. Further, the content of the silica is not more than 80 parts by weight, preferably not more than 70 parts by weight. When the content of the silica exceeds 80 parts by weight, processability and grip performance cannot be improved in good balance.

In the present invention, it is preferable to use a silane coupling agent together with a silica.

The silane coupling agent is not particularly limited, and examples are sulfide silane coupling agents such as bis(3-triethoxysilylpropyl)tetrasulfide, bis(2-triethoxysilylethyl) tetrasulfide, bis(3-trimethoxysilylpropyl) tetrasulfide, bis(2-trimethoxysilylethyl)tetrasulfide, bis(3-triethoxysilylpropyl) trisulfide, bis(3-trimethoxysilylpropyl)trisulfide, bis(3-triethoxysilylpropyl)disulfide, bis(3-trimethoxysilylpropyl) disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzothiazoltetrasulfide, 3-triethoxysilylpropyl methacrylate monosulfide and 3-trimethoxysilylpropyl methacrylate monosulfide; mercapto silane coupling agents such as 3-mercaptopropyltrimethoxysilane, 3-mercaptopropyltriethoxysilane, 2-mercaptoethyltrimethoxysilane and 2-mercaptoethyltriethoxysilane; vinyl silane coupling agents such as vinyltriethoxysilane and vinyltrimethoxysilane; amino silane coupling agents such as 3-aminopropyltriethoxysilane, 3-aminopropyltrimethoxysilane, 3-(2-aminoethyl)aminopropyltriethoxysilane and 3-(2-aminoethyl) aminopropyltrimethoxysilane; glycidoxy silane coupling agents such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitro silane coupling agents such as 3-nitropropyltrimethoxysilane and 3-nitropropyltriethoxysilane; chloro silane coupling agents such as 3-chloropropyltrimethoxysilane, 3-chloropropyltriethoxysilane, 2-chloroethyltrimethoxysilane and 2-chloroethyltriethoxysilane. These silane coupling agents may be used alone or at least 2 of these may be used in combination.

When the silane coupling agent is used in combination with a silica, a content of the silane coupling agent is preferably not less than 2% by weight, more preferably not less than 4% by weight based on 100% by weight of the silica. When the content of the silane coupling agent is less than 2% by weight, abrasion resistance tends to be inadequate. Further, the content of the silane coupling agent is preferably not more than 20% by weight, more preferably not more than 12% by weight. When the content of the silane coupling agent exceeds 20% by weight, there is a tendency that an effect of improving performance by the silane coupling agent is not worth for the cost.

Carbon black is not particularly limited, and carbon blacks such as N110, N220, N234, N326, N330, N351 and N550 that are generally used in the tire industry can be used. Among these, N220 is preferable because tires can be suitably colored in black and weather resistance can be further improved.

A content of carbon black is not more than 10 parts by weight, preferably not more than 6 parts by weight based on 100 parts by weight of the rubber component. When the content of carbon black exceeds 10 parts by weight, environment cannot be considered and decrease in petroleum supply in future cannot be prepared for because the content of petroleum resource is increased. Further, the content of carbon black is preferably not less than 2 parts by weight, more preferably not less than 4 parts by weight. When the content of carbon black is less than 2 parts by weight, tires cannot be adequately colored in black and additionally, weather resistance tends to be lowered.

In the present invention, environment can be considered and decrease in petroleum supply in future can be prepared for by containing specified amounts of a specific rubber component, specific silica and carbon black, and further, rolling resistance can be reduced and grip performance can be improved.

The rubber composition for a tread of the present invention may contain oil as a softening agent.

As for oil, process oil, vegetable oil and fat or a mixture thereof are exemplified, and the vegetable oil and fat is preferable because environment can be considered and decrease in petroleum supply in future can be prepared for.

As for process oil, paraffin process oil, naphthene process oil, and aromatic process oil are exemplified.

Examples of the vegetable oil and fat are castor oil, cotton seed oil, linseed oil, rapeseed oil, soy bean oil, palm oil, coconut oil, peanut oil, rosin, pine oil, pine tar, tall oil, corn oil, rice oil, sesame oil, olive oil, sunflower oil, palm kernel oil, camellia oil, jojoba oil, macadamia nut oil, safflower oil, and tung oil.

In the rubber composition for a tread of the present invention, compounding agents, for example, wax, various antioxidants, stearic acid, zinc oxide, a vulcanizing agent such as sulfur, and various vulcanization accelerators which are usually used in the tire industry can be suitably compounded, in addition to the aforementioned rubber components, silica, silane coupling agent, carbon black and softening agent.

The tire of the present invention is produced by a usual method from the rubber composition for a tread of the present invention. Namely, the rubber composition for a tread of the present invention in which the aforementioned compounding agents are compounded according to necessity is extruded and molded into a shape of a tread of a tire at an unvulcanized stage. Then an unvulcanized tire is molded by a usual method on a tire molding machine. The tire of the present invention can be produced by pressurizing and heating the unvulcanized tire in a vulcanizer.

The tire of the present invention has a tread produced from the rubber composition for a tread of the present invention and thus can be made as an echological tire that makes it possible to consider environment and also prepare for decrease in petroleum supply in future.

It is particularly preferable that the rubber composition for a tread of the present invention is used as a rubber composition for a cap tread because the rubber composition can reduce rolling resistance and improve grip performance

EXAMPLES

The present invention is explained in detail based on Examples, but the present invention is not limited only to these.

Here, various chemicals used in Examples and Comparative Examples are explained.

Natural rubber (NR): TSR 20

Epoxidized natural rubber (ENR): Epoxidized natural rubber (an epoxidization ratio of 25% by mole) available from Kumpulan Guthrie Berhad Co. (Malaysia)

Carbon black: SHOWBLACK N220, available from CABOT JAPAN K. K.
Silica A1: Carplex # 1120 (pH: 10.6) available from Degussa GmbH
Silica A2: ZEOSIL 40 (5% pH: 8.1) available from Rhodia
Silica A3: Ultrasil 360 (5% pH: 9.0) available from Degussa GmbH
Silica B1: Ultrasil VN3 (pH: 6.2) available from Degussa GmbH
Silane coupling agent: Si75 (bis(3-triethoxysilylpropyl)disulfide) available from Degussa GmbH
Oil: Soybean oil available from Nissin Oilio Group, Ltd.
Wax: SUNNOC WAX available from OUCHI SHINKO CHEMICAL INDUSTRIAL CO., LTD.
Antioxidant: NOCRAC 6C (N-(1,3-dimethylbutyl)-N'-phenyl-p-phenylenediamine) available from OUCHI SHINKO CHEMICAL INDUSTRIAL CO., LTD.
Stearic acid: STEARIC ACID available from NOF Corporation
Zinc oxide: ZINC OXIDE No. 1 available from Mitsui Mining & Smelting Co., Ltd.
Sulfur: SULFUR POWDER available from Tsurumi Chemical Industry Co., Ltd.
Vulcanization accelerator: NOCCELER CZ (N-cyclohexyl-2-benzothiazolylsulfenamide) available from OUCHI SHINKO CHEMICAL INDUSTRIAL CO., LTD.

Examples 1 to 11 and Comparative Examples 1 to 7

Chemicals other than sulfur and a vulcanization accelerator were kneaded according to the compounding prescription shown in Table 1 under the condition of about 150° C. for 4 minutes using 1.7 L Banbury mixer manufactured by Kobe Steel Ltd., to obtain kneaded products. Then, sulfur and a vulcanization accelerator were added to the obtained kneaded products, and the mixture was kneaded under the condition of 80° C. for 3 minutes using an open roll, to obtain unvulcanized rubber compositions. The resulting unvulcanized rubber compositions were molded into a tread shape, and laminated with other tire members and vulcanized under the condition of 150° C. for 30 minutes to prepare test tires (tire size: 195/65R15) for an automobile of Examples 1 to 11 and Comparative Examples 1 to 7.

(Rolling Resistance Test)

Rolling resistance was measured by running the aforementioned each test tire for an automobile on a drum under the condition of 25° C. Then, rolling resistance index of Comparative Example 1 was referred to as 100 and rolling resistance of each compounding was represented by an index. The larger the rolling resistance index is, the lower the rolling resistance is, and the more superior the rolling resistance property is.

(Rolling resistance index)=(Rolling resistance of Comparative Example 1)÷(Rolling resistance of each compounding)×100

(Grip Performance)

Grip performance was evaluated based on braking performance obtained by the evaluation test of antilock braking system (ABS). Namely, the aforementioned tires were loaded on an automobile equipped with 1800 cc class ABS, and in-vehicle running was conducted on an asphalt road surface (wet road surface, skid number was about 50). Brake was applied when the running speed was 100 km/h and deceleration until the automobile stopped was calculated. Here, deceleration represents the distance that the automobile ran until it stopped. Then, the grip performance index of Comparative Example 1 was referred to as 100 and deceleration of each compounding was represented by an index. The larger the grip performance index is, the better the braking performance is, and the more superior the grip performance is.

(Grip performance index)=(Deceleration of Comparative Example 1)÷(Deceleration of each compounding)×100

Evaluation results of the above-mentioned tests are shown in Table 1 and Table 2.

TABLE 1

|  | Example | | | | | | | | | | |
| --- | --- | --- | --- | --- | --- | --- | --- | --- | --- | --- | --- |
|  | 1 | 2 | 3 | 4 | 5 | 6 | 7 | 8 | 9 | 10 | 11 |
| Amounts (part by weight) | | | | | | | | | | | |
| NR | 50 | 30 | 20 | 5 | — | — | — | — | — | — | — |
| ENR | 50 | 70 | 80 | 95 | 100 | 100 | 100 | 100 | 100 | 100 | 100 |
| Carbon black | 5 | 5 | 5 | 5 | 5 | 5 | 5 | 5 | 2 | 4 | 10 |
| Silica A1 (pH 10.6) | 75 | 75 | 75 | 75 | 75 | — | — | 55 | 75 | 75 | 75 |
| Silica A2 (pH 8.1) | — | — | — | — | — | 75 | — | — | — | — | — |
| Silica A3 (pH 9.0) | — | — | — | — | — | — | 75 | — | — | — | — |
| Silica B1 (pH 6.2) | — | — | — | — | — | — | — | — | — | — | — |
| Silane coupling agent | 6 | 6 | 6 | 6 | 6 | 6 | 6 | 6 | 6 | 6 | 6 |
| Oil | 15 | 15 | 15 | 15 | 15 | 15 | 15 | 15 | 15 | 15 | 15 |
| Wax | 1.5 | 1.5 | 1.5 | 1.5 | 1.5 | 1.5 | 1.5 | 1.5 | 1.5 | 1.5 | 1.5 |
| Antioxidant | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 |
| Zinc oxide | 3 | 3 | 3 | 3 | 3 | 3 | 3 | 3 | 3 | 3 | 3 |
| Sulfur | 1.5 | 1.5 | 1.5 | 1.5 | 1.5 | 1.5 | 1.5 | 1.5 | 1.5 | 1.5 | 1.5 |
| Vulcanization accelerator | 2 | 2 | 2 | 2 | 2 | 2 | 2 | 2 | 2 | 2 | 2 |
| Evaluation Results | | | | | | | | | | | |
| Grip performance index | 103 | 104 | 104 | 105 | 105 | 100 | 100 | 101 | 105 | 105 | 105 |
| Rolling resistance index | 105 | 104 | 103 | 103 | 103 | 111 | 111 | 108 | 103 | 103 | 102 |

TABLE 2

|  | Comparative Example | | | | | | |
| --- | --- | --- | --- | --- | --- | --- | --- |
|  | 1 | 2 | 3 | 4 | 5 | 6 | 7 |
| Amounts (part by weight) | | | | | | | |
| NR | 70 | 50 | 100 | — | — | — | — |
| ENR | 30 | 50 | — | 100 | 100 | 100 | 100 |
| Carbon black | 5 | 5 | 5 | 5 | 5 | 5 | 5 |
| Silica A1 (pH 10.6) | — | — | 75 | — | — | 20 | 90 |
| Silica A2 (pH 8.1) | — | — | — | — | — | — | — |
| Silica A3 (pH 9.0) | — | — | — | — | — | — | — |
| Silica B1 (pH 6.2) | 75 | 75 | — | 55 | 75 | — | — |
| Silane coupling agent | 6 | 6 | 6 | 6 | 6 | 6 | 6 |
| Oil | 15 | 15 | 15 | 15 | 15 | 15 | 15 |
| Wax | 1.5 | 1.5 | 1.5 | 1.5 | 1.5 | 1.5 | 1.5 |
| Antioxidant | 2 | 2 | 2 | 2 | 2 | 2 | 2 |
| Stearic acid | 2 | 2 | 2 | 2 | 2 | 2 | 2 |
| Zinc oxide | 3 | 3 | 3 | 3 | 3 | 3 | 3 |
| Sulfur | 1.5 | 1.5 | 1.5 | 1.5 | 1.5 | 1.5 | 1.5 |
| Vulcanization accelerator | 2 | 2 | 2 | 2 | 2 | 2 | 2 |
| Evaluation Results | | | | | | | |
| Grip performance index | 100 | 101 | 80 | 100 | 103 | 76 | 103 |
| Rolling resistance index | 100 | 97 | 108 | 100 | 93 | 121 | 89 |

In Examples 1 to 11, since specified amounts of ENR, specific silica and carbon black are contained, rolling resistance can be reduced and grip performance can be improved.

Since the pH of the silica is low in Comparative Examples 1, 2, 4 and 5, an effect of improving grip performance is inadequate and rolling resistance is increased.

In Comparative Example 3, since ENR is not contained, grip performance is lowered.

In Comparative Examples 6 and 7, since specified amounts of silica is not contained, an effect of improving grip performance and an effect of reducing rolling resistance cannot be balanced well.

INDUSTRIAL APPLICABILITY

According to the present invention, there can be provided a rubber composition for a tread which contains specified amounts of a specific rubber component, a specific silica and carbon black, thereby making it possible to consider an effect on environment, prepare for decrease in petroleum supply in future, and further reduce rolling resistance and improve grip performance. There also can be provided a tire having a tread prepared by using the composition.

The invention claimed is:

1. A tire having a tread formed from a rubber composition for a tire tread, which comprises:
   30 to 80 parts by weight of a silica having a pH of 7.1 to 12.0 when dispersed in water to prepare a 5% aqueous dispersion; and
   not more than 10 parts by weight of a carbon black on the basis of 100 parts by weight of a rubber component comprising an epoxidized natural rubber.

2. The tire of claim 1, wherein a content of the epoxidized natural rubber in the rubber component is not less than 50% by weight.

3. The tire of claim 1, wherein the silica has a pH of 7.4 to 11.0 when dispersed in water to prepare a 5% aqueous dispersion.

4. The tire of claim 1, wherein the silica is present in an amount of 50 to 70 parts by weight.

5. The tire of claim 2, wherein the silica is present in an amount of 50 to 70 parts by weight.

* * * * *